United States Patent [19]

Shimizu

[11] Patent Number: 4,819,170

[45] Date of Patent: Apr. 4, 1989

[54] MOTOR-DRIVEN POWER STEERING SYSTEM FOR AUTOMOTIVE VEHICLES

[75] Inventor: Yasuo Shimizu, Saitama, Japan

[73] Assignee: Honda Giken Kogyo Kabushiki Kaisha, Tokyo, Japan

[21] Appl. No.: 27,378

[22] Filed: Mar. 18, 1987

[30] Foreign Application Priority Data

Mar. 24, 1986 [JP] Japan .................................. 61-65373

[51] Int. Cl.$^4$ ............................................. B62D 5/06
[52] U.S. Cl. .............................. 364/424.05; 180/79.1; 180/142
[58] Field of Search .................... 364/424; 74/388 PS; 180/79.1, 141, 142, 143

[56] References Cited

U.S. PATENT DOCUMENTS

| | | | |
|---|---|---|---|
| 4,657,103 | 4/1987 | Shimizu | 180/79.1 |
| 4,664,211 | 5/1987 | Oshita et al. | 180/79.1 |
| 4,681,181 | 7/1987 | Shimizu | 180/79.1 |
| 4,688,655 | 8/1987 | Shimizu | 180/79.1 |
| 4,715,461 | 12/1987 | Shimizu | 180/79.1 |
| 4,715,463 | 12/1987 | Shimizu | 180/142 |
| 4,726,437 | 2/1988 | Norton | 180/79.1 |

Primary Examiner—Gary Chin
Attorney, Agent, or Firm—Armstrong, Nikaido, Marmelstein & Kubovcik

[57] ABSTRACT

A motor-driven power steering system for an automotive vehicle has a control device for controlling a motor to generate assistive torque to be applied to an output shaft based on output signals from a torque detecting mechanism which detects steering torque acting on an input shaft. The control device has a control signal generating circuit for generating control signals including a component based on the steering torque signals, and a driving circuit responsive to the control signals for supplying a driving signal to said motor. The steering system also includes a mechanism for detecting a steering speed, a mechanism for detecting a vehicle speed, and a correcting mechanism for correcting a basic component based on the steering speed such that it is reduced as the vehicle speed increases. The control signal generating circuit receives a corrected steering speed component from the correcting mechanism and adds the corrected steering speed component to the steering torque component for generating the control signals including the corrected steering speed component.

6 Claims, 6 Drawing Sheets

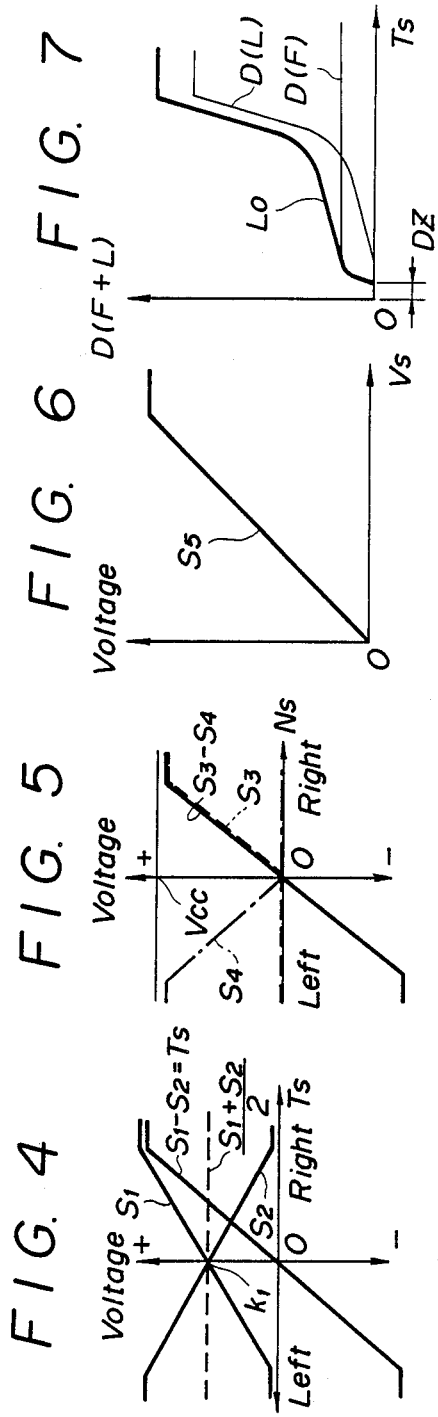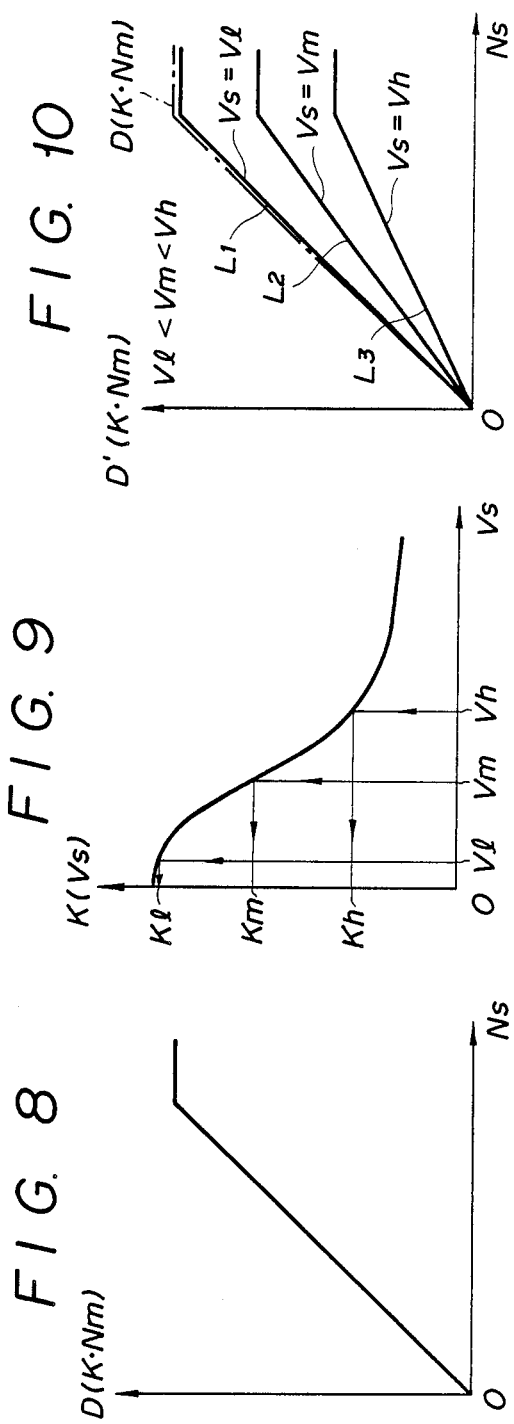

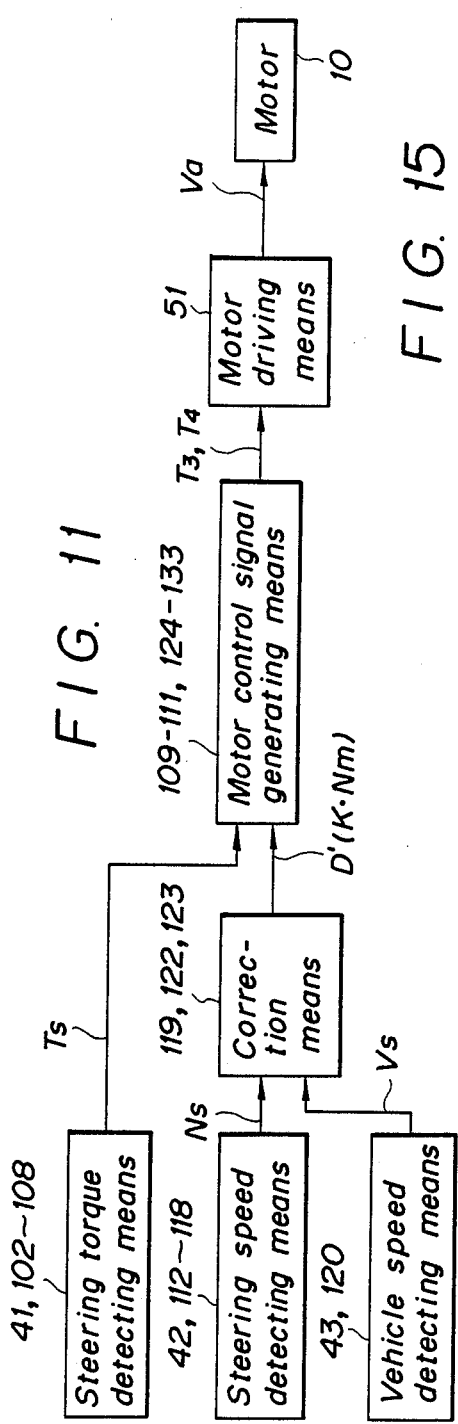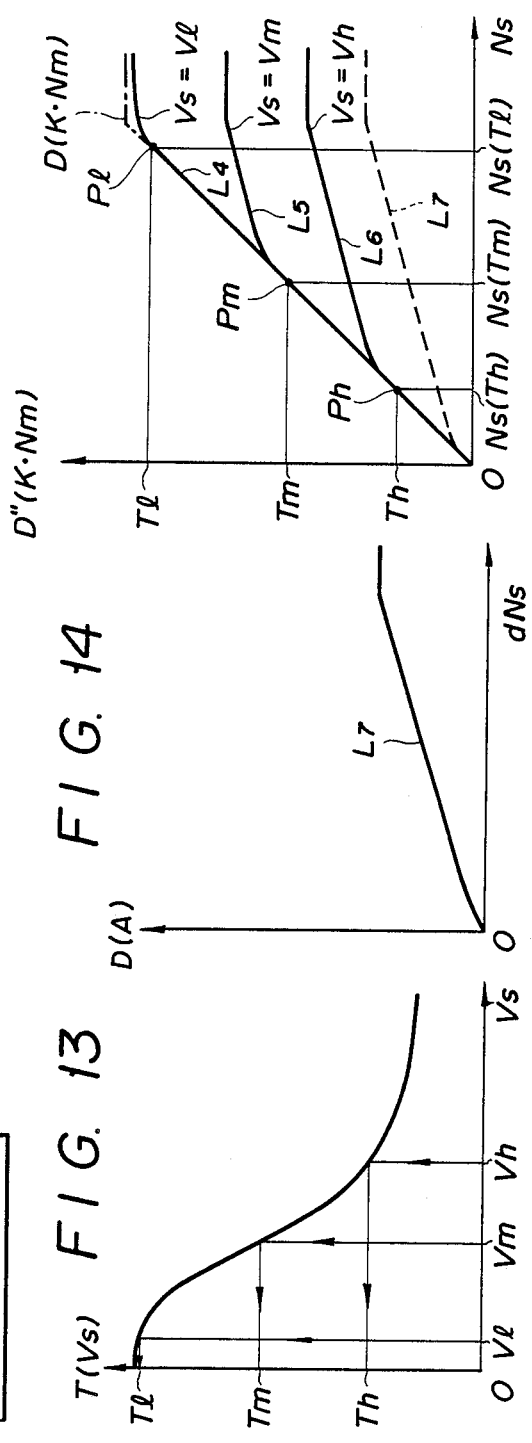

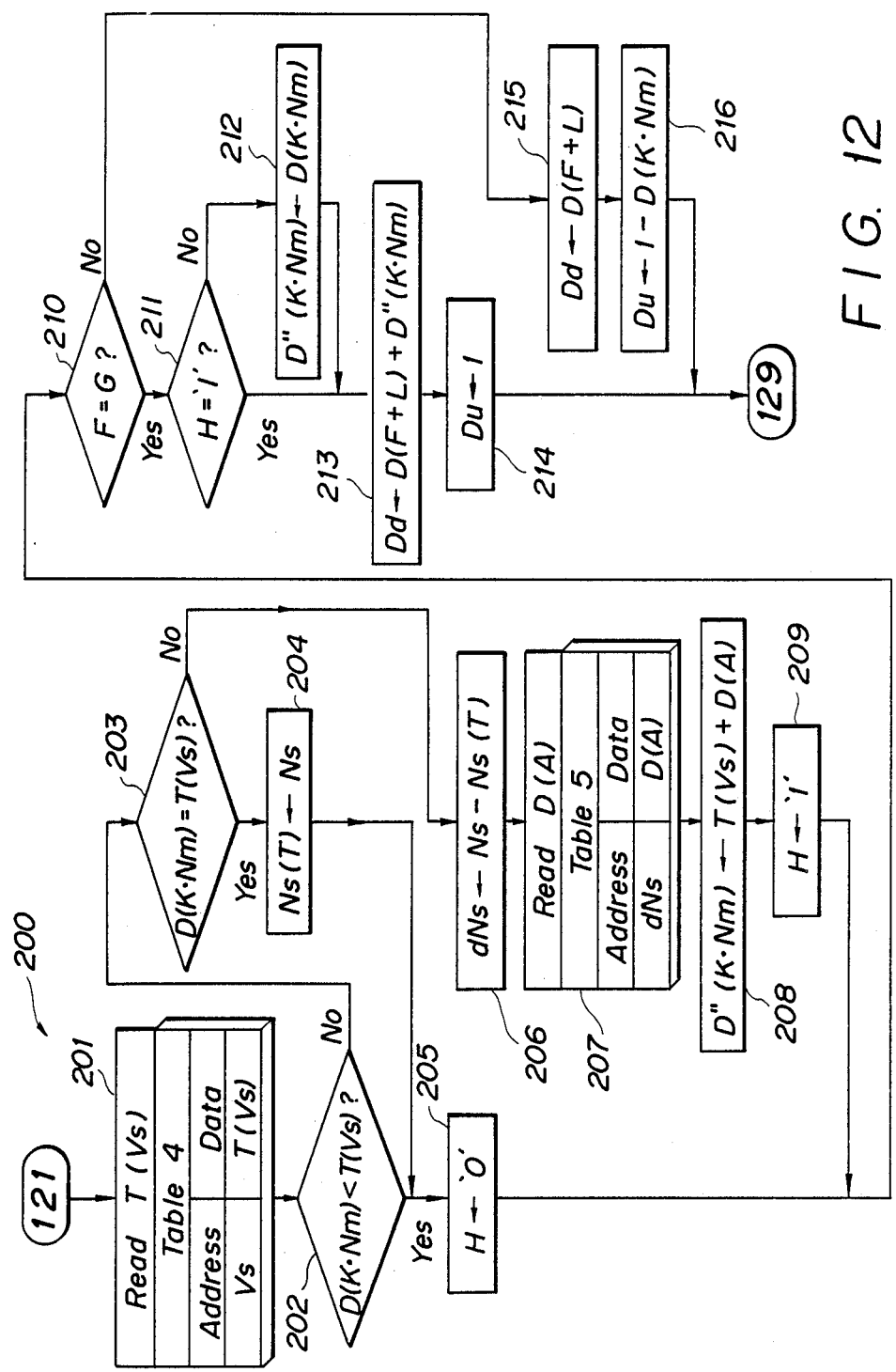

MOTOR-DRIVEN POWER STEERING SYSTEM FOR AUTOMOTIVE VEHICLES

BACKGROUND OF THE INVENTION

1. Field of the Invention

The present invention relates generally to a motor-driven power steering system for automotive vehicles, and more particularly to a motor-driven power steering system for automotive vehicles which employs an electric motor for generating assistive steering torque.

2. Description of the Relevant Art

There have been proposed in recent years various motor-driven power steering systems for automotive vehicles which employ an electric motor for generating assistive steering torque.

One known example is a steering system disclosed in U.S. Pat. No. 4,530,413 patented July 23, 1985. The disclosed steering system comprises a torque detecting mechanism for detecting steering torque Ts applied to an input shaft coupled to a steering wheel, an output shaft coupled to a gear box connected to steerable wheels, a DC motor for exerting assistive steering torque to the output shaft, and a control circuit for controlling the operation of the motor based on a signal from the torque detecting mechanism. The control circuit includes an anti-log power amplifier for exponentially modifying a steering torque input signal applied thereto, and applies an armature voltage proportional to the output of the anti-log power amplifier to the motor. Any vehicle speed sensor which would be required in ordinary motor-driven power steering systems is dispensed with by the use of the anti-log power amplifier. It is believed that the exponential output characteristic of the anti-log power amplifier is established on the general knowledge that the maximum value of the steering torque Ts decreases as the vehicle speed increases. The steering system disclosed in above U.S. Patent can produce suitable assistive steering torque thereby to give the driver a good steering feeling in all speed ranges from low to high vehicle speeds insofar as the steering speed Ns is relatively low.

With the above conventional steering system, however, the steering speed Ns at which the steering wheel is turned is not employed as a control parameter for the motor. Therefore, the rotational speed Nm of the motor may not be appropriately brought into conformity with the steering speed Ns at some values of the steering speed Ns. Moreover, where the steering speed Ns is relatively large, the value of the steering torque Ts becomes relatively large even if the vehicle speed is relatively high. When this happens, the motor generates a relatively large assistive torque which prevents the driver from gaining a normal road feeling.

The present invention has been made in view of the aforesaid problems of the conventional motor-driven power steering system for automotive vehicles.

SUMMARY OF THE INVENTION

It is an object of the present invention to provide a motor-driven power steering system for automotive vehicles which allows the rotational speed of an assistive torque generating motor to appropriately match the steering speed and which allows the driver to have a normal road feeling even when the steering speed is high at a relatively high vehicle speed.

To achieve the above object, there is provided according to the present invention a motor-driven power steering system for an automotive vehicle, comprising: an input shaft operatively coupled to a steering wheel; an output shaft operatively coupled to a steerable wheel; an electric motor applying assistive torque to the output shaft; a torque detecting device for detecting steering torque acting on the input shaft; a control device for controlling the motor based on output signals from the torque detecting means. The control device has a control signal generating device for receiving the steering torque signals from the steering torque detecting device and for generating control signals including a component based on the steering torque signals, and a driving device responsive to the control signals for supplying a driving signal to the motor. Also provided are a device for detecting a steering speed of the steering wheel, a device for detecting a vehicle speed, and a correcting device for receiving the detected signals from the steering speed detecting device and a detected signal from the vehicle speed detecting device and for correcting a basic component based on the steering speed such that it is reduced as the vehicle speed increases. The control signal generating device is arranged to receive a corrected steering speed component from the correcting device and to add the corrected steering speed component to the steering torque component for generating the control signals including the corrected steering speed component.

The above and further objects, details and advantages of the present invention will become apparent from the following detailed description of preferred embodiments thereof, when read in conjunction with the accompanying drawings.

BRIEF DESCRIPTION OF THE DRAWINGS

FIG. 4 is a graph showing signals of detected steering torque;

FIG. 5 is a graph showing signals of detected steering speed;

FIG. 6 is a graph showing a signal of vehicle speed signal;

FIG. 7 is a graph showing the relationship between a steering torque and a friction/load duty ratio;

FIG. 8 is a graph illustrating the relationship between a steering speed and a basic duty ratio of induced electromotive force;

FIG. 9 is a graph illustrating the relationship between a vehicle speed and a corrective coefficient;

FIG. 10 is a graph showing the relationship between a steering speed and a corrective duty ratio at various vehicle speeds;

FIG. 11 is a functional block diagram of the control device shown in FIG. 2;

FIG. 12 is a flowchart of a control sequence according to a modification of the control sequence shown in FIG. 3;

FIG. 13 is a graph showing the relationship between a vehicle speed and a turning point value;

FIG. 14 is a graph showing the relationship between an increase in steering speed and an additional duty ratio; and FIG. 15 is a graph showing the relationship between a steering speed and a corrective duty ratio in the modified control sequence.

DETAILED DESCRIPTION OF THE PREFERRED EMBODIMENTS

Figure 1:
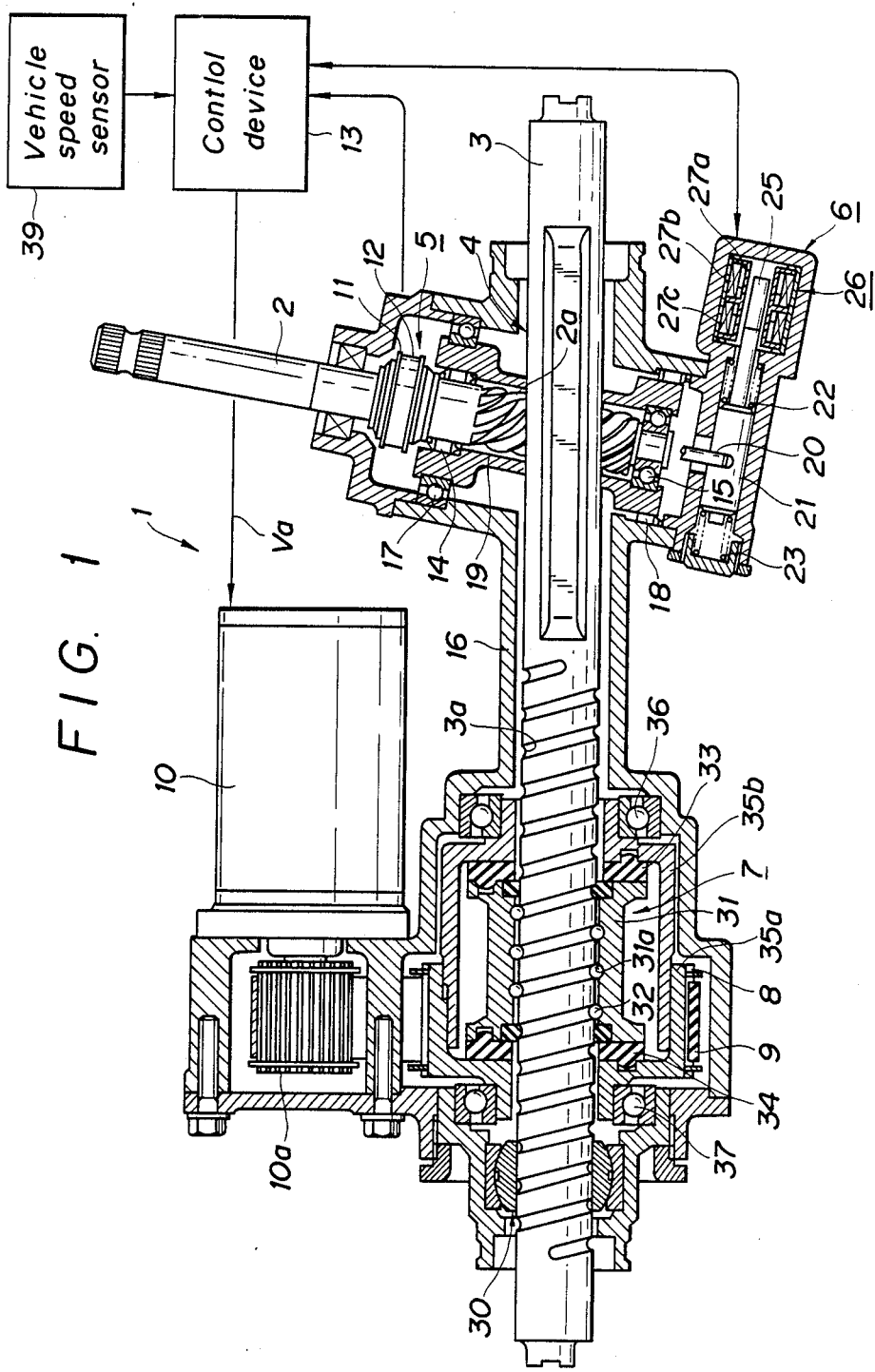
FIG. 1 is a longitudinal cross-sectional view, partly in block form, of a motor-driven power steering system for automotive vehicles according to a preferred embodiment of the present invention.

As shown in FIG. 1, a motor-driven power steering system 1 according to a preferred embodiment of the present invention has a pinion shaft 2 operatively coupled to a steering wheel (not shown) through a constant-velocity universal joint (not shown) and a steering shaft (not shown), and a rack shaft 3 having rack teeth 4 defined on its back and held in mesh with a pinion gear 2a defined on a lower portion of the pinion shaft 2. The rack shaft 3 has its opposite ends coupled to the knuckles of steerable or dirigible wheels through tie rods (not shown). Rotation of the steering wheel is converted by the pinion shaft 2 to linear motion of the rack shaft 3. The pinion shaft 2 and the rack shaft 3 serve respectively as input and output shafts.

Around the pinion shaft 2, there are disposed a steering speed sensor 5 and a steering torque sensor 6. A DC motor 10, for generating assistive steering torque, is positioned near the rack shaft 3 remotely from the rack teeth 4. The motor 10 has its output shaft supporting a toothed pulley 10a that is operatively coupled by a timing belt 9 to a larger-diameter pulley 8 disposed around the rack shaft 3. Thus, rotation of the motor 10 is transmitted via the pulley 10a and the timing belt 9 to the larger-diameter pulley 8. Rotation of the larger-diameter pulley 8 is in turn transmitted to the rack shaft 3 through a ball screw mechanism 7 disposed around the rack shaft 3. The toothed pulley 10a, the timing belt 9, the larger-diameter pulley 8, and the ball screw mechanism 7 jointly constitute a speed reducer for reducing the speed of rotation of the motor 10 and transmitting the rotation of the motor 10 at a reduced speed to the rack shaft 3 to enable the rack shaft 3 to make linear motion. The motor 10 is controlled by a control device 13, as described later on. The control device 13 is supplied with a detected signal from a vehicle speed sensor 39 as well as detected signals from the steering speed sensor 5 and the steering torque sensor 6.

The steering speed sensor 5 comprises a DC generator or tachogenerator (not shown) located behind the pinion shaft 2, a smaller-diameter toothed pulley (not shown) mounted on one end of the shaft of the DC generator, a larger-diameter toothed pulley 11 mounted on the pinion shaft 2, and a timing belt 12 trained around these pulleys. The DC generator of the steering speed sensor 5 generates a DC voltage having a polarity dependent on the direction in which the pinion shaft 2 rotates and a magnitude proportional to the speed of rotation of the pinion shaft 2. The output signal from the steering speed sensor 5 is applied to the control device 13. The steering speed sensor 5 may be operatively coupled to the output shaft 3, rather than the input shaft 2.

The steering torque sensor 6 comprises a pinion holder 19 rotatably disposed around the pinion gear 2a, a piston 21 axially movable by a pin 20 integral with the pinion holder 19 in response to rotation of the pinion holder 19, a pair of springs 22, 23 disposed on opposite sides of the piston 21 for normally urging the piston 21 toward its central or neutral position, and a differential transformer 26 coupled to the piston 21 for converting axial displacement of the piston 21 to an electric signal. The pinion holder 19 is rotatably supported in a casing 16 by means of a pair of bearings 17, 18, and the pinion gear 2a is rotatably supported in the pinion holder 19 by means of bearings 14, 15. The rotational axis of the pinion gear 2a is radially displaced from the rotational axis of the pinion holder 19. When the steering wheel is in its neutral position and the steering torque Ts is zero, a straight line interconnecting the rotational axes of the pinion gear 2a and the pinion holder 19 extends substantially perpendicularly to the longitudinal axis of the rack shaft 3. In case a load on the rack shaft 3 is larger than the steering torque acting on the pinion gear 2a, the pinion gear 2a is prevented from rotating about its own axis, but the pinion holder 19 is caused to rotate, due to meshing engagement of the pinion gear 2a and the rack teeth 4. Stated otherwise, the pinion gear 2a revolves around the axis of the pinion holder 19. The rotation of the pinion holder 19 is transmitted by the pin 20 to the piston 21, which is moved in its axial direction until it counterbalances the reactive forces from the springs 22, 23. Therefore, the axial displacement of the piston 21 is proportional to the steering torque Ts applied. To one end of the piston 21, there is attached an iron core 25 serving as a magnetic body axially movable with the piston 21. Axial displacement of the iron core 25 is detected by the differential transformer 26. The differential transformer 26 comprises a primary coil 27a and a pair of secondary coils 27b, 27c. The control device 13 applies an AC voltage to the primary coil 27a, and outputs from the secondary coils 27b, 27c are supplied to the control device 13. The amplitude of the outputs from the secondary coils 27b, 27c is differentially variable with the axial displacement of the iron core 25. The outputs from the secondary coils 27b, 27c serve as signals of detected steering torque which indicate the magnitude of the steering torque Ts and the direction in which it acts.

The rack shaft 3 has a helical screw groove 3a defined on a portion thereof remote from the rack teeth 4 meshing with the pinion gear 2a. The rack shaft portion with the helical screw groove 3a is supported in the casing 16 by a spherical bearing 30 for angular movement and axial sliding movement. The ball screw mechanism 7 comprises a ball nut 31 with a helical screw groove 31a defined in its inner circumferential surface. The ball nut 31 is disposed over the helical screw groove 3a, there being a plurality of balls 32 interposed between the ball nut 31 and the rack shaft 3. The balls 32 are received in the screw grooves 3a, 31a and roll therebetween in circulating motion through a circulatory path (not shown) in the ball nut 31. Consequently, rotation of the ball but 31 is smoothly transmitted via the balls 32 to the rack shaft 3 for linearly moving the rack shaft 3. The ball nut 31 has its opposite ends resiliently clamped between pulley cases 35a, 35b. through respective resilient members 33, 34. The pulley cases 35a, 35b are rotatably supported in the casing 16 via a pair of angular contact bearings 36, 37. The larger-diameter pulley 8 is mounted on the outer circumferential surface of the pulley case 35a.

The control device 13 will be described with reference to FIG. 2.

The control device 13 includes a microcomputer unit (hereinafter referred to as an "MCU") 40. The MCU 40 is supplied with detected steering torque signals S1, S2 from a steering torque detector circuit 41, detected steering speed signals S3, S4 from a steering speed detector circuit 42, and a detected signal S5 from a vehicle speed detector circuit 43, through an A/D converter 40a under commands of the MCU 40.

The steering torque detector circuit 41 comprises the steering torque sensor 6, and an interface 44 for supplying the primary coil 27a of the differential transformer 26 with an AC signal that is produced by frequency-dividing clock pulses T1 in the MCU 40 and for rectifying, smoothing, and converting the outputs from the secondary coils 27b, 27c to DC voltage signals S1, S2 which are then applied as the detected steering torque signals to the MCU 40.

The steering speed detector circuit 42 comprises the steering speed sensor 5, and an interface 45 for removing high-frequency components from the output signal produced from the output terminals of the DC generator of the sensor 5 to produce the detected steering speed signals S3, S4.

The vehicle speed detector circuit 43 comprises the vehicle speed sensor 39 and an interface 45. The vehicle speed sensor 39 comprises a magnet (not shown) rotatable with a speedometer cable and a reed switch (not shown) intermittently turned on and off in response to rotation of the magnet. The interface 45 serves to supply electric power to the reed switch, and also to shape the waveform of a pulse signal produced by the reed switch as it is intermittently turned on and off.

Although not specifically shown, the MCU 40 has an I/O port, memories (RAM, ROM), a CPU, registers, and a clock generator to which clock pulses from a quartz resonator are supplied.

The MCU 40 and other circuits are energized by a power supply circuit 48 comprising a relay circuit 49 connected via a fuse circuit 48a and an ignition switch to an automobile-mounted battery 47, and a voltage stabilizer 50. The relay circuit 49 has an output terminal 49a for supplying electric power to a motor driver circuit 51 (described later). The voltage stabilizer 50 has an output terminal 50a for supplying a constant voltage to the MCU 40, the steering torque detector circuit 41, the steering speed detector circuit 42, and the vehicle speed detector circuit 43. When the ignition switch is turned on, the MCU 40 starts its operation to process the signals S1 through S5 from the detector circuits 41, 42, 43 according to a program stored in the memory for applying driving signals T3, T4 to the motor driver circuit 51. The driving signal T3 is a direction control signal indicating the direction in which the motor 10 is to rotate, and the driving signal T4 is a signal for determining the magnitude of an armature voltage Va. The signals T3, T4 are control signals supplied to the motor driver circuit 51.

The motor driver circuit 51 comprises an interface 52 supplied with the control signals T3, T4 and a bridge circuit 60 having four FETs 53, 54, 55, 56. The motor 10 has opposite terminals connected to respective output nodes of the bridge circuit 60 between the FETs 53, 54 and between the FETs 56, 55. The input nodes of the bridge circuit 60 between the FETs 53, 56 and between the FETs 54, 55 are connected respectively to the output terminal 49a of the relay circuit 49 and the negative terminal of the battery 47. The FETs 53, 54, 55, 56 have respective gate terminals to which output terminals 52a, 52d, 52b, 52c of the interface 52 are connected, respectively.

While the steering wheel is being positively turned, the interface 52 operates in the following manner based on the control signals T3, T4 from the MCU 40:

(I) When the steering torque Ts acts clockwise:

The interface 52 continuously drives the FET 53 on with a PWM signal of a duty ratio of 1 (one) from the output terminal 52a, and drives the FET 55 on and off with a PWM signal from the output terminal 52b.

(II) When the steering torque Ts acts counter-clockwise:

The interface 52 continuously drives the FET 56 on with a PWM signal of a duty ratio of 1 (one) from the output terminal 52c, and drives the FET 54 on and off with a PWM signal from the output terminal 52d.

When the steering torque Ts is null, any of the FETs is not driven. The PWM signals applied to the FETs 55, 54 are produced by modulating the pulse duration of a rectangular pulse signal of fixed frequency and battery level with the armature voltage signal T4. Thus, an armature voltage Va of desired polarity and magnitude is applied to the motor 10 for controlling the direction of rotation the motor 10 and its power (rotational speed and torque).

In case the FETs 53, 55 are driven, the magnitude of the armature voltage Va is proportional to the pulse duration of the PWM signal supplied from the output terminal 52b of the interface 52, and the polarity of the armature voltage Va is such that an armature current Ia flows in the direction of the arrow A to rotate the motor 10 clockwise. Conversely, in case the FETs 56, 54 are driven, the magnitude of the armature voltage Va is proportional to the pulse duration of the PWM signal supplied from the output terminal 52d of the interface 52, and the polarity of the armature voltage Va is such that the armature current Ia flows in the direction of the arrow B to rotate the motor 10 counterclockwise.

Operation of the MCU 40 will be described below with reference to FIG. 3.

Figure 3:
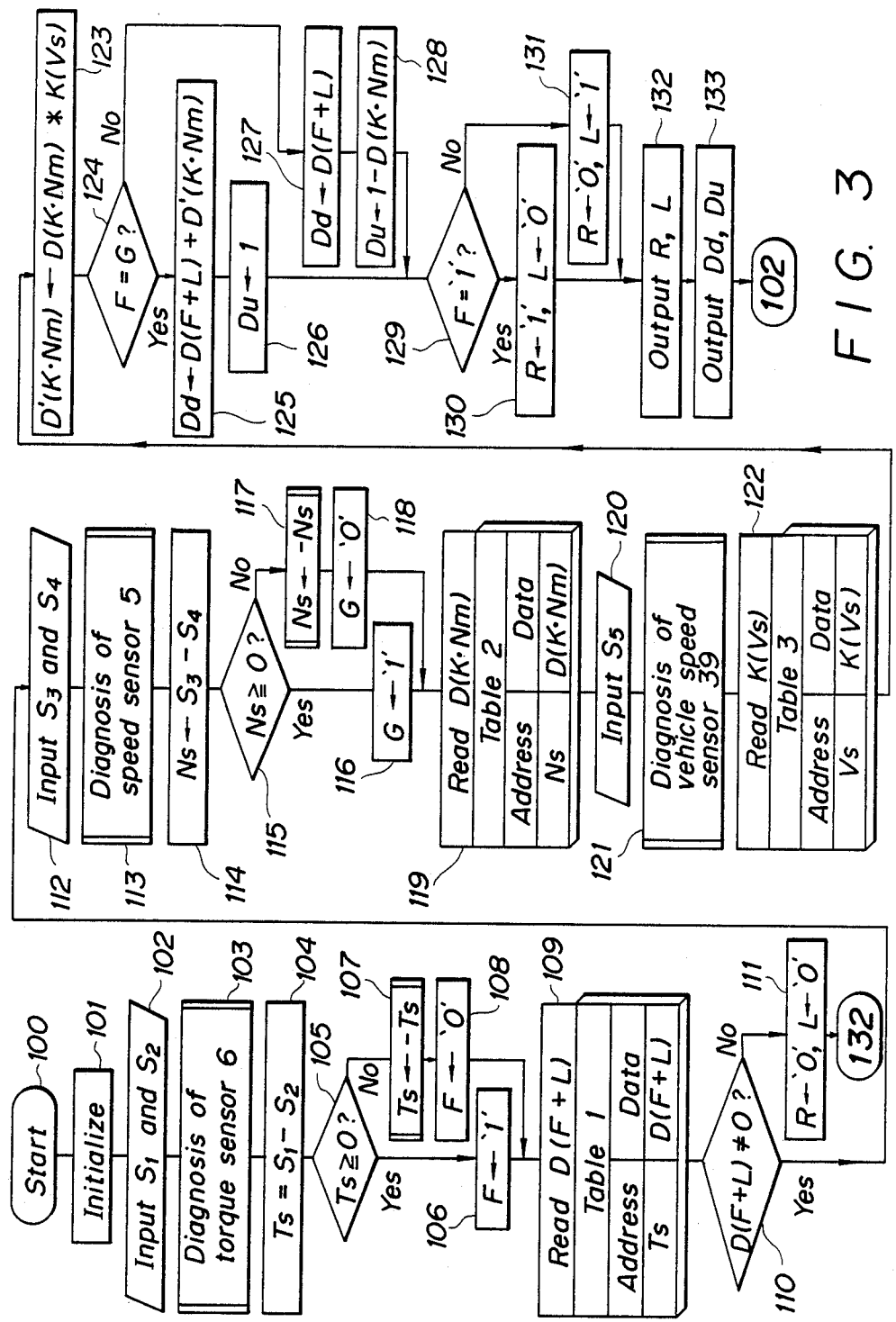
FIG. 3 is a flowchart of a control sequence executed by a microcomputer in the control device.

A control sequence shown in FIG. 3 has successive processing steps 100 through 133.

When the ignition switch is turned on, the MCU 40 and the other circuits are supplied with electric power to start the control process in a step 100.

First, the data items in the registers and the RAM of the MCU 40 and necessary circuits are initialized at a step 101.

Then, steering torque signals S1, S2 are successively read in a step 102.

A next step 103 ascertains whether the values of the detected signals S1, S2 are normal or not to effect failure diagnosis of the steering torque sensor 6. If any failure is detected, then the MCU supplies a driving signal T2 to the relay circuit 49 to stop the supply of electric power to the motor driver circuit 51. If the values of the signals S1, S2 are normal, then control proceeds to a step 104. In this connection, since the steering torque sensor 6 includes the differential transformer 26, the output signals S1, S2 from the steering torque sensor 6 can be plotted as shown in FIG. 4 if the steering torque detector circuit 41 is normal. FIG. 4 indicates that half of the sum of the signals S1, S2 is of a substantially constant value k1. In the step 103, the steering torque detector circuit 41 is determined as malfunctioning if the difference between $(S1+S2)/2$ and k1 does not fall within a predetermined range. When the steering torque Ts exceeds a prescribed value in each of the clockwise and counter-clockwise directions of rotation of the steering wheel, the values of the signals S1, S2 remain constant as shown in FIG. 4 since the angle of rotation of the input shaft 2 and the axial displacement of the output shaft 3 are limited to certain ranges, respectively.

In the step 104, the difference (S1−S2) is calculated and regarded as the value of steering torque Ts.

The step 104 is followed by a step 105 which ascertains whether the value of Ts is positive or negative in order to determine the direction in which the steering torque Ts acts. If the steering torque acts in the clockwise direction, i.e., if it is positive or zero, then a steering torque direction flag F is set to "1" in a step 106. If the steering torque Ts is of a negative value in the step 105, then control goes from the step 105 to a step 107 in which the value of the steering torque Ts is converted to its absolute value (Ts=−Ts). Thereafter, the steering torque direction flag F is reset to "0" in a step 108.

In a next step 109, a data item in a table 1 stored in the ROM (not shown) is read out by addressing it based on the absolute value of the steering torque Ts. Specifically, the ROM table stores duty ratios D(F+L) for friction losses and road loads, which are related to the absolute values of the steering torque Ts as indicated by a curve L0 in FIG. 7. The friction/load duty ratios D(F+L) are represented by the sum of duty ratios D(F) and D(L) in FIG. 7. The duty ratio D(F) is a duty ratio for the friction loss of the motor 10, and the duty ratio D(L) is a duty ratio for the road load. Denoted at DZ in FIG. 7 is a deal zone. Actually, the absolute values of the steering torque Ts are multiplied and their integral parts are used for addressing. This holds true for subsequent steps 119, 122.

A step 110 ascertains whether a friction/load duty ratio D(F+L) thus determined is zero or not. If zero, then control goes to a step 112. If not zero, then control goes to a step 111 in which flags R, L indicative of the direction of rotation of the motor 10 are reset to "1", and duty ratios Dd, Du (described later) are set to zero. In this case, it is determined that no steering torque Ts is applied. After the step 111, control goes to a step 132.

The step 112 reads in the detected signals S3, S4 from the steering speed detecting circuit 42, and a next step 113 diagnoses whether the signal values thus read in are normal or not. If abnormal, then the signals S3, S4 are cancelled by setting these signals to S3=S4=0. In the event that the steering speed detecting circuit 42 is normal, the steering speed Ns and the detected signals S3, S4 from the circuit 42 are of the mutual relationship as shown in FIG. 7. Therefore, when the DC voltage values of the detected signals S3, S4 are simultaneously positive, and when either one of the signals S3, S4 is substantially equal to the voltage Vcc of the voltage stabilizer 50, it is determined that the steering speed detecting circuit 42 is malfunctioning. The generator of the steering speed sensor 5 is selected such that its expected maximum output is lower than the voltage Vcc by a prescribed value.

A step 114 then calculates (S3−S4) and employs the difference between the signals S3, S4 as the value of the steering speed Ns.

A step 115 ascertains whether the value of Ns is positive or negative in order to determine the direction of the steering speed. If the steering speed Ns is rightward, i.e., zero or more, a steering direction flag G is set to "1" in a step 116. If the steering speed Ns is negative in the step 115, then control proceeds to a step 117 in which the steering speed Ns is converted to its absolute value (Ns=−Ns). Then, the steering direction flag G is reset to "0" in a step 118.

In a next step 119, a data item in a table 2 stored in the ROM (not shown) is read out by addressing it based on the absolute value of the steering torque Ts. Specifically, the ROM table stores basic duty ratios D(K·Nm) for induced electromotive forces K·Nm, which are related to the absolute values of the steering torque Ts as indicated in FIG. 8. K denotes an induced electromotive force constant of the motor 10, and Nm denotes a rotational speed of the motor 10. Therefore, the step 119 reads out a basic duty ratio D(K·Nm) for an induced electromotive force K Nm with its address represented by the absolute value of the steering speed N. In this connection, the armature voltage Va and the armature current Ia of the motor 10 are of the relationship: $Va = Ia \cdot Ra + K \cdot Nm$, where Ra, K are the internal resistance and the induced electromotive force constant of the motor 10. Since the speed reduction ratio of the speed reducer 10a, 9, 8, 7 for transmitting the rotation of the motor 10 to the rack shaft 3 is constant, the induced electromotive force K Nm of the motor 10 can be determined on the basis of the steering speed Ns. The basic duty ratio D(K·Nm) is regarded here as a component corresponding to the steering speed Ns in the armature voltage Va.

In a step 120, the detected signal S5 from the vehicle speed detector circuit 43 is read in and its value is used as a vehicle speed Vs. FIG. 6 shows characteristics of the signal S5. A next step 121 ascertains whether the value of the signal S5 is in a predetermined range for diagnosis of the vehicle speed sensor 39 for failure. If the value of the signal S5 is not in the predetermined range, then the vehicle speed sensor is determined as malfunctioning, and a relatively high vehicle speed value Vh (described later on) is substituted for the signal Vs.

In a next step 122, a data item in a table 3 stored in the ROM (not shown) is read out by addressing it based on the vehicle speed Vs. Specifically, the ROM table stores corrective coefficients K(Vs) which are related to the vehicle speeds Vs as indicated in FIG. 9. Vl, Vm, Vh in FIG. 9 represent a relatively low vehicle speed, a medium vehicle speed, and a relatively high vehicle speed, respectively. Three corrective coefficents KK1 ($\approx 1$), Km, Kh in FIG. 9 correspond respectively to these vehicle speeds Vl, Vm, Vh. The corrective coefficient K(Vs) is reduced as the vehicle speed Vs increases.

In a step 123, the basic duty ratio D(K·Nm) determined in the step 119 is multiplied by the corrective coefficient K(Vs), and the product is used as a corrected duty ratio D'(K·Nm) for the induced electromotive force. The corrected duty ratio D'(K·Nm) thus determined varies as shown in FIG. 10 provided the vehicle speed Vs is kept at a certain value. For example, if the vehicle speed Vs is kept at the above three vehicle speeds Vl, Vm, Vh, the corrected duty ratio D'(K·Nm) varies with respect to the steering speed Ns as indicated by respective curves L1, L2, L3 in FIG. 10.

A step 124 ascertains whether the steering torque direction flag F and the steering rotation direction flag G are of the same value. If F=G="1", then it is determined that the steering torque Ts acts clockwise and the steering wheel is rotated clockwise, so that the steering wheel is positively turned. If F=G="0", then it is determined that the steering torque Ts acts counterclockwise and the steering wheel is rotated counterclockwise, so that the steering wheel is positively turned. Then, control goes to a step 125. However, if F="1" and G="0", then it is determined that the steering torque Ts acts clockwise but the steering wheel is rotated counter-clockwise, so that the steering wheel is being returned. If F="0" and G="1", then it is determined that the steering torque Ts acts counterclockwise but the steering wheel is rotated clockwise, so that the steering wheel is being returned. Then, control goes to a step 127.

The step 125 calculates $D(F+L)+D'(K\cdot Nm)$ and employs the calculated value as the duty ratio Dd of the PWM signal to be applied to the lower FET 55 or 54. The step 125 is followed by a step 126 in which 1 (one) is employed as the duty ratio Du of the PWM signal to be applied to the upper FET 53 or 56. Thereafter, control goes from the step 126 to a step 129.

In the step 127, the friction/load duty ratio $D(F+L)$ is employed as the duty ratio Dd of the PWM signal to be applied to the FET 55 or 54. In a next step 128, the basic duty ratio $D(K\cdot Nm)$ is subtracted from 1 (one), and the difference is employed as the duty ratio Du of the PWM signal to be applied to the FET 53 or 56. Control then proceeds to the step 129.

The step 129 checks the content of the flag F in order to determine the direction in which the steering torque Ts acts. If F ="1", then the rotation direction flags R, L are set to "1" and "0", respectively, in a step 130. If F="0", then the rotation direction flags R, L are set to "0" and "1", respectively in a step 131.

A next step 132 issues the values of the direction flags R, L which have been set in any of the steps 111, 130, 131. The direction flags R, L correspond to the direction signal T3. Where R="1" and L="0", the FETs 53, 55 are driven in order to rotate the motor 10 clockwise. Where R="0" and L="1", the FETs 56, 54 are driven in order to rotate the motor 10 counterclockwise. In case R="0" and L="0", none of the FETs are driven, and the armature voltage Va applied to the motor 10 is null. Stated otherwise, in case both of R and L are "0", the PWM signals are not applied to any of the FETs 53 through 56.

A step 133 issues the duty ratios Dd, Du set in the steps 125, 126 or the steps 127, 128. These duty ratios Dd, Du correspond to the control signal T4. Where the value of Du is 1 (one), the PWM signal applied to the selected one of the FETs 53, 56 is continuously ON. After the step 133, control returns to the step 102.

Figure 2:
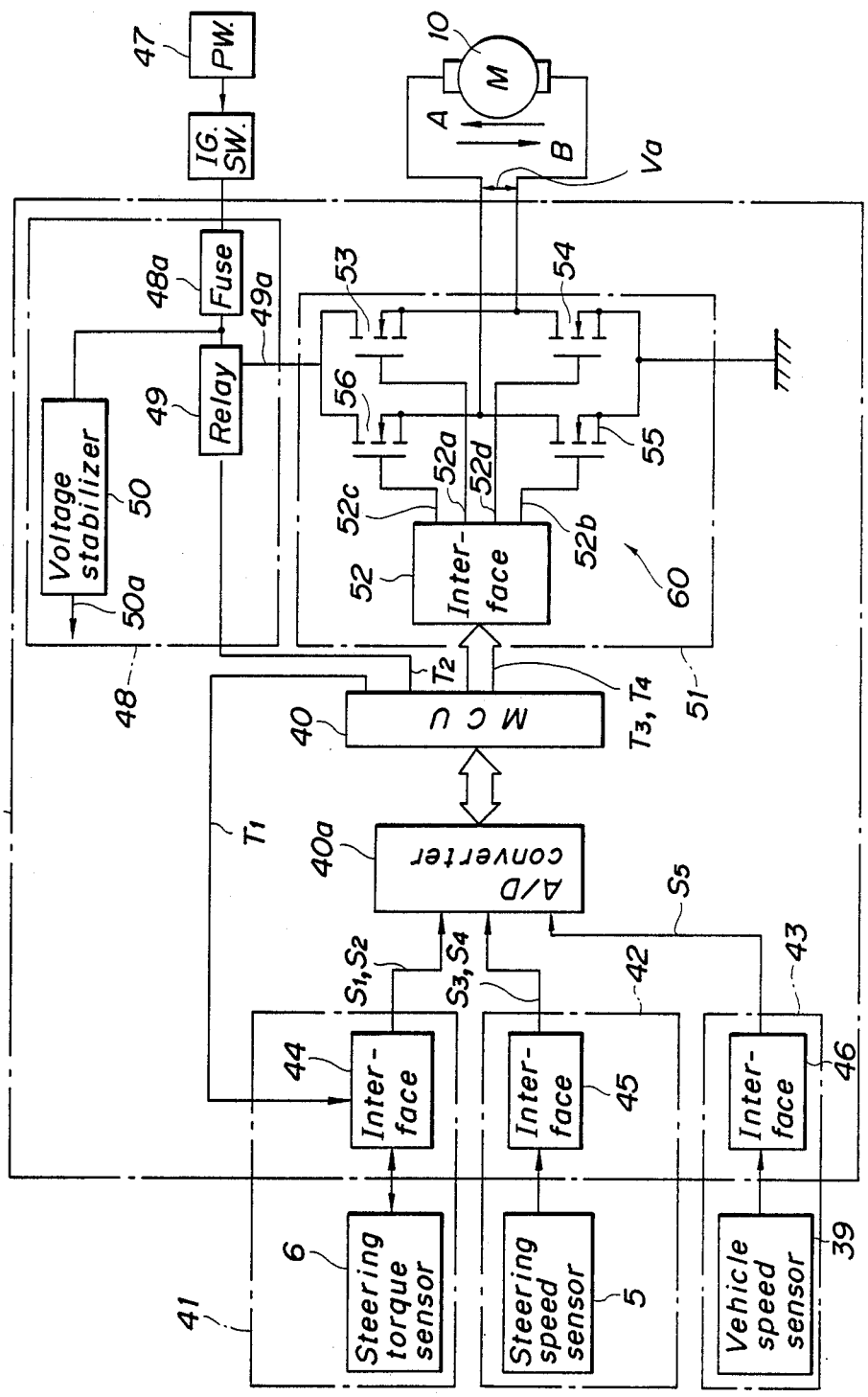
FIG. 2 is a block diagram of a control device of the motor-driven power steering system shown in FIG. 1.

FIG. 11 is a block diagram which represents the basic functions of the control device or circuit 13 by interrelating the components of the control device 13 shown in FIG. 2 and the steps of the control sequence shown in FIG. 3.

In the block diagram of FIG. 11, the steering speed Ns is employed as one of control parameters for the motor 10. Specifically, the basic duty ratio $D(K\cdot Nm)$ for the induced electromotive force $K\cdot Nm$ of the motor 10 is determined based on the steering speed Ns. Therefore, the rotational speed Nm of the motor 10 is basically brought into conformity with the steering speed Ns. As shown in FIG. 10, the corrected duty ratio $D'(K\cdot Nm)$ is determined such that it is reduced as the vehicle speed Vs is increased, based on the basic duty ratio $D(K\cdot Nm)$. The duty ratio $D'(K\cdot Nm)$ thus determined decreases as the vehicle speed Vs increases provided the steering speed Ns is constant. Therefore, if the steering torque Ts and the steering speed Ns are constant, then the armature voltage Va applied to the motor 10 is reduced as the vehicle speed Vs rises. See the steps 125, 126. Where the steering torque Ts and the steering speed Ns are fixed to large values, particularly, the assistive torque produced by the motor 10 decreases as the vehicle speed Vs increases. As a result, in the case where the steering speed Ns is large at a relatively high vehicle speed, no relatively large assistive torque is produced allowing the driver to gain a normal road feeling. In addition to the basic duty ratio $D(K\cdot Nm)$, the friction/load duty ratio $D(F+L)$ may additionally be corrected by the corrective coefficient K(Vs).

A modified control sequence 200 executed by the MCU 40 will be described with reference to FIG. 12. The modified control sequence 200 includes steps 201 through 216 which are executed in place of the steps 122 through 128 of FIG. 3. In the aforesaid embodiment of FIG. 3, the gradient of the corrected duty ratio $D'(K\cdot Nm)$ is constant given a vehicle speed Vs as shown in FIG. 10. In the modification, however, as shown in FIG. 15, the gradient of a corrected duty ratio $D''(K\cdot Nm)$ is equal to that of the basic duty ratio $D(K\cdot Nm)$ up to a turning point P determined by a vehicle speed Vs, and is reduced beyond that turning point.

In a step 201, a data item in a table 4 stored in the ROM (not shown) is read out by addressing it based on the vehicle speed Vs. Specifically, the ROM table stores turning point values T(Vs) which are related to the vehicle speeds Vs as indicated in FIG. 13. Vl, Vm, Vh in FIG. 13 represent a relatively low vehicle speed, a medium vehicle speed, and a relatively high vehicle speed, respectively, which are the same as those shown in FIG. 9. Three turning point values Tl, Tm, Th in FIG. 13 correspond respectively to these vehicle speeds Vl, Vm, Vh. The turning point value T(Vs) is reduced as the vehicle speed Vs increases. As illustrated in FIG. 15, the turning point value T(Vs) represents a corrected duty ratio $D'(K\cdot Nm)$ at a point where the gradient of a corrected duty ratio $D''(K\cdot Nm)$ varies to a small degree, at a certain vehicle speed Vsi. For example, when the vehicle speed Vs is of the values Vl, Vm, Vh, the corrected duty ratio $D''(K\cdot Nm)$ varies with respect to the steering speed Ns as indicated by respective curves L4, L5, L6 in FIG. 15. The gradients of the curves L4, L5, L6 slightly vary at the turning point values Pl, Pm, Ph. Specifically, while the steering speed Ns increases from zero to Ns(Tl), Ns(Tm), Ns(Th) at the respective vehicle speeds Vl, Vm, Vh, the corrected duty ratio $D''(K\cdot Nm)$ varies at the same gradient as that of the basic duty ratio $D(K\cdot Nm)$. When the steering speed Ns exceeds Ns(Tl), Ns(Tm), Ns(Th), the corrected duty ratio $D''(K\cdot Nm)$ has a reduced gradient.

A next step 202 ascertains whether the basic duty ratio $D(K\cdot Nm)$ determined in the step 119 is smaller than the turning point value T(Vs) or not. If smaller, then it is determined that the basic duty ratio $D(K\cdot Nm)$ does not reach the turning point value T(Vs), and control goes to a step 205. If not, control goes to a step 203. In the step 205, a turning flag H is reset to "0". Then control goes to a step 210. The turning flag H is indicative of whether the basic duty ratio $D(K\cdot Nm)$ is in excess of the turning point value T(Vs) or not at a certain vehicle speed. If $D(K\cdot Nm)$ does not exceeds T(Vs), then the flag H is reset to "0", and if $D(K\ Nm)$ theoretically exceeds T(Vs), then the flag H is set to "1" as in a step 209.

The step 203 ascertains whether the basic duty ratio $D(K\ Nm)$ is equal to the turning point value T(Vs) or not within a small prescribed tolerance. If equal, then control goes to a step 204, and if not, then control goes to a step 206.

In the step 204, the steering speed Ns determined at the time by the step 114 is employed as a steering speed Ns(T) at the turning point. Control then goes to the step 205.

In the step 206, the steering speed Ns(T) at the turning point is subtracted from the steering speed Ns determined at the time by the step 114, and the difference is employed as a steering speed increase dNs from the turning point. The steering speed Ns(T) at the turning point, which is used in the step 206, is of a value that has been determined at the step 204. Practically, however, it is preferable that the step 204 be omitted and the turning point steering speed Ns(T) be derived from the turning point value T(Vs). With the turning point values Tl, Tm, Th determined as described above, the turning point steering speeds Ns(Tl), Ns(Tm), Ns(Th) can easily be determined. See FIG. 15.

The step 206 is followed by a step 207 in which a data item in a table 5 stored in the ROM (not shown) is read out by addressing it based on the steering speed increase dNs determined as above. Specifically, the ROM table stores additional duty ratios D(A) which are related to the increases dNs as indicated in FIG. 14. The duty ratio D(A) varies as shown by a curve L7 in FIG. 14, and the gradient thereof is smaller than that of the curve L3 of FIG. 10. FIG. 15 also shows the curve L7 for a better understanding.

The turning point value T(Vs) and the duty ratio D(A) are added and the sum is employed as a corrected duty ratio D"(K·Nm) in a step 208. Then, the turning flag H is set to "1" in a step 209, which is followed by the step 210.

The step 210 ascertains whether the steering torque direction flag F and the steering rotation direction flag G are set to the same value. If so, then it is determined that the steering wheel is positively turned, and control proceeds to a step 211. If not, then it is determined that the steering wheel is returning, and control goes to a step 215.

The step 211 ascertains whether the turning flag H has been set to "1" or not. If set to "1", then it is determined that the basic duty ratio D(K·Nm) has exceeded the turning point value T(Vs), and control goes directly to a step 213. If not set to "1", then it is determined that the basic duty ratio D(K·Nm) has not exceeded the turning point value T(Vs). Control goes to the step 213 after the basic duty ratio D(K·Nm) has been employed as the corrected duty ratio D"(K·Nm) in a step 212.

In the step 213, the friction/load duty ratio D(F+L) and the corrected duty ratio D"(K·Nm) are added, and the sum is employed as the duty ratio Dd of a PWM signal to be applied to the lower FET 55 or 54. In a next step, 1 (one) is employed as the duty ratio Du of a PWM signal to be applied to the upper FET 53 or 56. Control then proceeds from the step 214 to the step 129.

In the step 215, the friction/load duty ratio D(F+L) is employed as the duty ratio Dd of a PWM signal to be applied to the FET 55 or 54. In a next step 216, the basic duty ratio D(K·Nm) is subtracted from 1 (one), and the difference is employed as the duty ratio Du of a PWM signal to be applied to the FEN 52 or 56. Control goes from the step 216 to the step 129.

In the modified control sequence 200, the basic duty ratio D(K·Nm) for the induced electromotive force K Nm of the motor 10 is determined on the steering speed Ns. Therefore, the rotational speed Nm of the motor 10 is basically in agreement with the steering speed Ns. As shown in FIG. 15, the corrected duty ratio D"(K·Nm) is determined such that is generally reduced as the vehicle speed Vs increases, based on the basic duty ratio D(K·Nm). More specifically, when the basic duty ratio D(K·Nm) is smaller than the turning point value T(Vs), the basic duty ratio D(K·Nm) is employed as the corrected duty ratio D"(K·Nm). When basic duty ratio D(K·Nm) is larger than the turning point value T(Vs), the sum of the turning point value T(Vs) and the additional duty ratio D(A) is employed as the corrected duty ratio D"(K·Nm). Insofar as the vehicle speed Vs is constant, the corrected duty ratio D"(K·Nm) increases with the steering speed Ns in the same manner as the basic duty ratio D(K·Nm) up to the turning point value T(Vs), and beyond the turning point value T(Vs), the corrected duty ratio D"(K·Nm) increases at a gradient smaller than that of the basic duty ratio D(K·Nm). Unless the steering speed Ns reaches a value Ns(T) corresponding to the turning point value T(Vs), the armature voltage Va applied to the motor 10 is not reduced. As shown in FIG. 13, the turning point value T(Vs) decreases as the vehicle speed Vs increases. For example, when the vehicle speed Vs=Vh, the corrected duty ratio D"(K·Nm) varies as indicated by the curve L6 in FIG. 15. Therefore, even when the steering speed Ns is large at a relatively high vehicle speed, no relatively large assistive torque is generated, and the driver is allowed to gain a normal road feeling. The driver can have a better road feeling as long as the steering speed Ns is in a small range.

The corrected duty ratio is not limited to D'(K·Nm) and D"(K·Nm) shown in FIGS. 10 and 15, but may be appropriately established insofar as it is generally reduced as the vehicle speed Vs increases.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

I claim:

1. A motor-driven steering system for an automotive vehicle, comprising:
    an input shaft coupled to a steering wheel;
    an output shaft coupled to a steerable wheel;
    an electric motor applying assistive torque to said output shaft;
    steering torque detecting means for detecting steering torque acting on said input shaft;
    steering speed detecting means for detecting a steering speed of the steering wheel;
    vehicle speed detecting means for detecting a vehicle speed;
    control means for controlling said motor, said control means having a control signal generating means for receiving output signals from said steering torque detecting means, from said steering speed detecting means and from said vehicle speed detecting means, and said control signal generating means for generating control signals including a steering torque component, based on the detected steering torque, and a basic steering speed component, based on the detected steering speed; and driving means responsive to said control signals for supplying a driving signal to said motor;

said control signal generating means having a correcting means for receiving said output signal from said steering speed detecting means and said output signal from said vehicle speed detecting means, and said correcting means for correcting said basic steering speed component such that the basic steering speed component is reduced as the vehicle speed increases; and said control signal generating means receiving said output signal from said steering torque detecting means, and adding the corrected steering speed component to said steering torque component for generating said control signals.

2. A motor-driven power steering system according to claim 1, wherein said basic steering speed component increases at a first rate in proportion to the steering speed.

3. A motor-driven steering system according to claim 2, wherein said correcting means determines a corrective coefficient which decreases as the vehicle speed increases, and also determines the corrected steering speed component by multiplying said corrective coefficient and said basic steering speed component.

4. A motor-driven steering system according to claim 2, wherein said correcting means determines a certain value, based on the detected vehicle speed, and a function, which has a vehicle speed as a factor thereof and which decreases as the vehicle speed increases, obtains a corresponding steering speed which has the same basic steering speed components with said certain value, determines a difference between the detected steering speed and said corresponding steering speed, obtains an additional steering speed component based on said difference and a function which has said difference as a factor thereof, and which increases at a second rate smaller than said first rate in proportion to said difference, and uses a sum of said certain value and said additional steering speed component as said corrected steering speed component.

5. A motor-driven steering system according to claim 2, wherein said correcting means determines a certain value, based on the detected vehicle speed, and a function, which has a vehicle speed as a factor thereof and which decreases as the vehicle speed increases, obtains a corresponding steering speed which has the same basic steering speed component with said certain value, uses said basic steering component as said corrected steering speed component when said basic steering speed component is smaller than said certain value, and uses a sum of said certain value and an additional steering speed component as said corrected steering speed component when said basic steering speed component is larger than said certain value, said additional steering speed component is obtained based on a difference between the detected steering speed and said corresponding steering speed and on a function which has said difference as a factor thereof, and which increases at a second rate smaller than said first rate in proportion to said difference.

6. A motor-driven steering system according to claim 1, wherein said basic steering speed component increases in proportion to the detected steering speed.

* * * * *